United States Patent [19]

Kupersmit

[11] Patent Number: 4,572,408
[45] Date of Patent: Feb. 25, 1986

[54] POUR SPOUT CONSTRUCTION FOR COLLAPSIBLE CONTAINERS

[76] Inventor: Julius B. Kupersmit, 145-80 228th St., Springfield Gardens, N.Y. 11413

[21] Appl. No.: 490,884

[22] Filed: May 2, 1983

[51] Int. Cl.⁴ .............................................. B65D 25/46
[52] U.S. Cl. ................................... 222/153; 222/528; 222/532
[58] Field of Search ............... 222/528, 531, 532, 153; 229/17 B

[56] References Cited

U.S. PATENT DOCUMENTS

| | | | |
|---|---|---|---|
| 2,077,341 | 4/1937 | Martin et al. | 222/528 UX |
| 2,288,042 | 6/1942 | Spilman | 222/528 |
| 2,546,052 | 3/1951 | Wilkins | 222/528 |
| 3,193,152 | 7/1965 | White | 222/531 X |
| 4,239,149 | 12/1980 | Kupersmit | 220/4 F X |
| 4,361,250 | 11/1982 | Foster | 222/153 X |
| 4,382,514 | 5/1983 | Williams | 229/17 B X |

*Primary Examiner*—Joseph J. Rolla
*Assistant Examiner*—Frederick R. Handren
*Attorney, Agent, or Firm*—Charles E. Temko

[57] ABSTRACT

A pour spout construction suitable for large collapsible reusable shipping containers employed for transporting particulate materials. The construction includes a spout member which folds against a side wall of the container rather than projects into the interior thereof, so as to afford no interference to the collapsing of the container when not in use, and no frictional resistance to opening the spout caused by the engagement of particulate material under pressure.

2 Claims, 4 Drawing Figures

POUR SPOUT CONSTRUCTION FOR COLLAPSIBLE CONTAINERS

BACKGROUND OF THE INVENTION

This invention relates generally to the field of collapsible type shipping containers used for transporting bulky cargo, and which may be placed in generally planar configuration when emptied to facilitate return shipment for refilling. Devices of this general type are widely used in the shipment of bulk particulate materials such as chemicals, raw and partly prepared materials, and the like.

Such containers are often of substantial dimensions, e.g. four feet square, and are sometimes provided with a door in one side wall to facilitate unloading. Where the particulate material is of small size, the presence of the door is not without accompanying difficulties, such as the problem of readily opening the same against the pressure of the load from within, as well as seepage of the contents of the container. Once opened, it is usually impossible to reclose the door before substantially emptying the contents of the container.

Ideally, such containers would benefit by the presence of a large pour spout localized at or near the bottom of the container in a side wall. Unfortunately, conventional foldable pour spouts of a type used in the packaging of salt or powdered soap for domestic use do not lend themselves to installation in collapsible shipping containers. Such spouts are usually constructed of light weight stamped sheet metal hingedly connected at an inner end to an edge of an opening in a container wall. When closed, the side walls of the spout enter the enclosed volume of the container. Where such a spout is placed at a lower edge of a side wall of a large loaded container, the particulate material, under pressure of its own weight contacts the surfaces of the spout, creating sufficient friction to effectively prevent the withdrawal thereof to opened condition.

SUMMARY OF THE INVENTION

Briefly stated, the invention contemplates the provision of an improved pour spout construction suitable for use with large collapsible shipping containers in which the above mentioned disadvantages have been substantially eliminated. The spout construction is formed from foldable fibrous material, parts of which are interconnected within an opening in a side wall of the container. A cover element overlies the spout when in folded condition and is secured to the juxtaposed side wall by expanding fasteners of a type known in the art to prevent seepage of the contents. When folded, the spout does not project into the interior of the container, and, accordingly, does not interfere with the collapsing of the container when empty.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
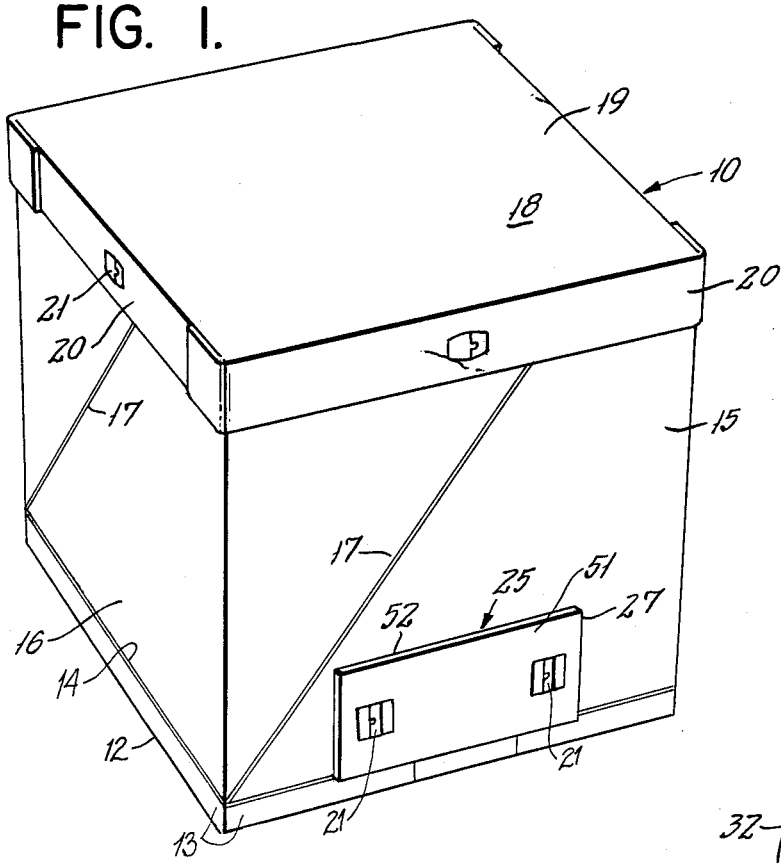
FIG. 1 is a view in perspective of an embodiment of the invention, with a spout element thereof in closed condition.

In accordance with the invention, the device, generally indicated by reference character 10 is in the form of a known type of collapsible shipping container, as, for example, that disclosed in my prior U.S. Pat. No. 4,221,302. The device includes a bottom wall having integrally formed upstanding peripheral wall sections 13 terminating in a continuous fold line 14. A pair of foldable side walls, one of which is indicated by reference character 15, and a pair of foldable end walls, one of which is indicated by reference character 16, may each include fold lines 17 to facilitate the collapsing of the container. A lid element 18 is conventional, and includes an upper wall 19 and interconnected peripheral walls 20. It is held in position upon the side and end walls 15 and 16 by suitable expandable fasteners 21, as, for example, those disclosed in my prior U.S. Pat. No. 4,239,149, granted Dec. 16, 1980.

Positioned adjacent a lower edge of one side wall 15 is a spout element 25 comprising a spout member 26, a spout cover member 27, an upper flap 28 and a lower flap 29.

Figure 3:
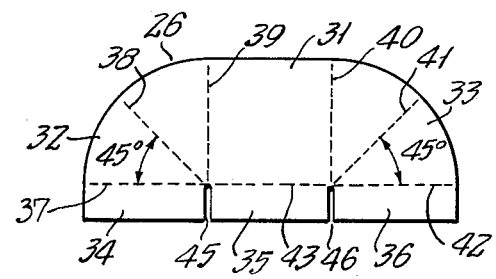
FIG. 3 is a view in elevation of a spout element in flattened or developed condition prior to installation.

The spout element 26 is best understood from a consideration of FIG. 3, and includes a main or bottom wall 31, a pair of opposed side walls 32 and 33, respectively, and first, second, and third glue flaps 34, 35, and 36. The above members are interconnected by first, second, third, fourth, fifth, sixth, and seventh fold lines 37–43. Small cut outs 45 and 46 separate the flaps 34–36 to facilitate installation, as will more fully appear hereinafter.

Figure 4:
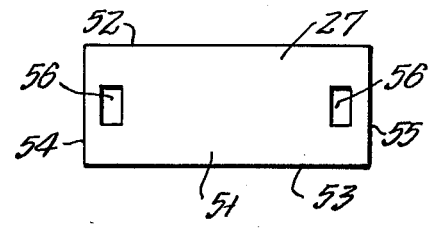
FIG. 4 is a view in elevation of a spout cover.

Referring to FIG. 4, the cover member 27 is of generally planar configuration, and is bounded by an inner surface (not shown), an outer surface 51, an upper edge 52, a lower edge 53, and side edges 54 and 55. Rectangular openings 56 are disposed adjacent either end of the cover, and selectively overlie corresponding openings, 57 and 58 in the side wall 15.

The upper flap 28 is formed by the cutting of a rectangular opening in the side wall 15, and is bounded by an upper fold edge 60 which permits pivotal interconnection therewith, side edges 61 and 62, and a lower free edge which may be provided with a small cut out 64 to facilitate manual engagement.

Figure 2:
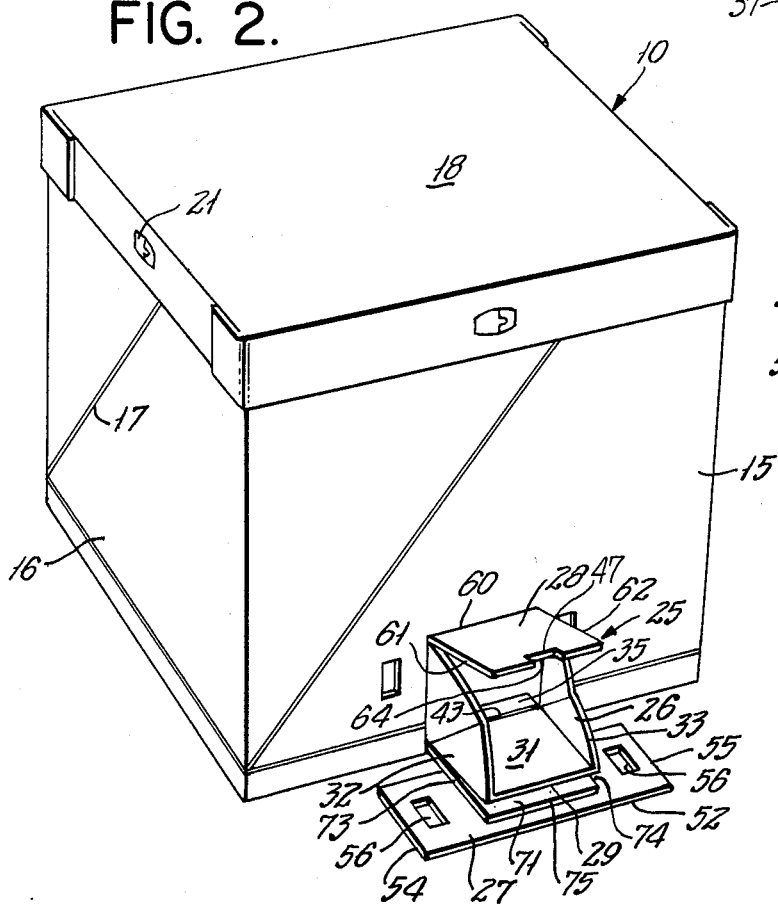
FIG. 2 is a similar perspective view thereof with the spout element in opened condition.

The lower flap 29 is attached at the bottom of wall 15, and forms a means for attaching the cover member 27. It is bounded by an outer surface (not shown), an inner surface 71, a lower fold edge 72, side edges 73 and 74, and an upper free edge 75. The outer surface thereof is glued to the inner surface 50 of the cover member, as best seen in FIG. 2.

The container 10 will normally be filled after being placed in erected condition with the spout element 25 in closed condition. In this condition, the upper flap 28 will normally have been moved into generally coplanar relation with the wall 15. The spout will be folded along the angularly disposed fold lines 38 and 41, so that the thereby formed pie-shaped elements are placed in juxtaposed relation beneath the cover member 27. The cover member is secured to the outer surface of the wall 15 by fasteners 21. In this condition, the construction is more than adequate to resist internal pressures caused by the weight of the particulate material bearing against the upper flap 28.

To open the spout element, the fasteners 21 are removed, and the integrated lower flap 29 and cover member 27 are swung downwardly to the position shown. Next, the spout member 26 is unfolded. Finally, the free edge cut out 64 is manually engaged, and upper flap 28 is moved upwardly to disclose the opening in the wall 15 from which it was originally severed.

Under the weight of gravity, the contents will flow through the opening as the contents are removed permitting a substantial part of the entire load to be readily dispensed. When the level of the load has lowered, the remainder of the contents may be removed either through the opening, using a shovel or other implement, or the lid element 18 may be removed to provide access. Once emptied, the spout element may be returned to closed condition, in which it lies substantially in coplanar relation with respect to the wall 15, following which the container 10 may be collapsed in known manner for reshipment.

I wish it to be understood that I do not consider the invention limited to the precise details of structure shown and set forth in this specification, for obvious modifications will occur to those skilled in the art to which the invention pertains.

I claim:

1. An improved pour spout for use with a container having a side wall and an opening in said side wall, said pour spout having a generally rectangular bottom wall, and a pair of foldably interconnected side walls, each of said side walls having at least one medially disposed fold line therein delineating a plurality of pie-shaped mutually foldable segments; whereby when said pour spout is mounted within said opening in said side wall of said container, said pour spout may be moved to closed condition to lie substantially in coplanar relation with said last mentioned wall, said bottom wall of said pour spout overlying said foldable segments; means, free of said bottom wall, selectively interconnectable with said side wall of said container, adjacent said opening, for maintaining said pour spout in closed condition, said last-mentioned means comprising a planar cover overlying said pour spout and extending laterally therefrom, and defining a pair of outwardly disposed openings in the plane thereof, said wall of said container having corresponding openings selectively underlying said first mentioned openings, and an expandable fastener means engaging the edges of said first mentioned and last mentioned openings to maintain said cover member in condition overlying said pour spout.

2. Improved pour spout construction in accordance with claim 1, further comprising means attaching said cover member to said container.

* * * * *